(12) United States Patent
Zheng et al.

(10) Patent No.: US 11,341,683 B2
(45) Date of Patent: May 24, 2022

(54) SMART SELF CALIBRATING CAMERA SYSTEM

(71) Applicant: AiFi Corp, Santa Clara, CA (US)

(72) Inventors: Ying Zheng, Santa Clara, CA (US); Hector Sanchez, Santa Clara, CA (US); Steve Gu, Santa Clara, CA (US); Staurt Kyle Neubarth, Mountain View, CA (US); Mahmoud Hassan, Cambridge, MA (US); Juan Ramon Terven, Queretaro (MX)

(73) Assignee: AiFi Corp, Santa Clara, CA (US)

(*) Notice: Subject to any disclaimer, the term of this patent is extended or adjusted under 35 U.S.C. 154(b) by 0 days.

(21) Appl. No.: 17/028,388

(22) Filed: Sep. 22, 2020

(65) Prior Publication Data

US 2022/0092818 A1 Mar. 24, 2022

(51) Int. Cl.
*H04N 17/00* (2006.01)
*H04N 17/02* (2006.01)
*G06T 7/80* (2017.01)
*H04N 5/232* (2006.01)

(52) U.S. Cl.
CPC ...... *G06T 7/80* (2017.01); *G06T 2207/10024* (2013.01); *G06T 2207/20084* (2013.01); *G06T 2207/30204* (2013.01); *H04N 5/232* (2013.01)

(58) Field of Classification Search
CPC ........ H04N 7/18; H04N 5/232; H04N 5/0733; H04N 17/00; H04N 17/02; G06T 7/80; G06T 7/85; G06T 2207/10024; G06T 2207/20084; G06T 2207/30204
USPC .................................................. 348/175, 159
See application file for complete search history.

(56) References Cited

U.S. PATENT DOCUMENTS

| | | | |
|---|---|---|---|
| 10,347,009 B1* | 7/2019 | Terven | G06T 7/73 |
| 10,565,736 B2* | 2/2020 | Oba | H04N 5/232 |
| 10,827,116 B1* | 11/2020 | Terven | G06T 7/85 |
| 11,109,006 B2* | 8/2021 | Kaji | G03B 21/00 |
| 2006/0125920 A1* | 6/2006 | Criminisi | G06T 7/593 |
| | | | 348/159 |
| 2018/0091704 A1* | 3/2018 | Koyama | H04N 5/0733 |

* cited by examiner

*Primary Examiner* — Trang U Tran
(74) *Attorney, Agent, or Firm* — Jun Liu

(57) ABSTRACT

The present invention describes a system for calibrating a plurality of cameras in an area. The system functions by using certain patterns with visible or invisible properties In addition, the system implements automatic re-calibration in a specific way to reduce human intervention, cost and time.

9 Claims, 3 Drawing Sheets

Synchronizing system time for the plurality of cameras 105

Detecting at least one feature points of an object that is within range of the plurality of cameras, wherein the at least one feature points are setup in a pre-determined fashion, wherein the at least one feature points are configured within range of the plurality of cameras, wherein the at least one feature points are configured to be detected by color or infrared means, wherein any point of the at least one feature points are encoded with location information of the at least one feature points, wherein the location information of the at least one feature points are decoded and recorded during a duration of time 110

Calibrating the plurality of cameras by using the location information of the at least one feature points during a duration of time 115

Capturing a first set of one or more images of the feature points of the object along the route by a first one of the plurality of cameras and a second set of one or more images of the feature points of the object along the route by a second one of the plurality of cameras, wherein time stamp is recorded for each capturing 120

Calibrating the first one of the plurality of cameras and the second one of the plurality of cameras by matching same feature points on the object between the first set of one or more images of the object and the second set of one or more images of the object at same time stamp 125

Detecting feature points of a person, wherein the feature points are specific body area of the person, wherein the feature points are within range of the plurality of cameras, wherein dimensions of the specific body area of the person are measured and recorded 205

Capturing a first set of one or more images of the feature points by a first one of the plurality of cameras and a second set of one or more images of the feature points by a second one of the plurality of cameras 210

Calibrating the first one of the plurality of cameras and the second one of the plurality of cameras by matching same feature points between the first set of one or more images of the object and the second set of one or more images 215

```
┌─────────────────────────────────────────────────────────────────────────┐
│ Detecting patterns in the area, wherein location of the patterns are pre-determined, wherein shape of the │
│ patterns are pre-determined, wherein color of the patterns are pre-determined, wherein the patterns are │
│ configured to contain encoded coordinate information, wherein the patterns are configured to be detected │
│ by optical or infrared means 305 │
└─────────────────────────────────────────────────────────────────────────┘
                                        ⇓
┌─────────────────────────────────────────────────────────────────────────┐
│ Capturing a first set of one or more images of the patterns by a first one of the plurality of cameras and a │
│ second set of one or more images of the patterns by a second one of the plurality of cameras 310 │
└─────────────────────────────────────────────────────────────────────────┘
                                        ⇓
┌─────────────────────────────────────────────────────────────────────────┐
│ Decoding the encoded coordinate information 315 │
└─────────────────────────────────────────────────────────────────────────┘
                                        ⇓
┌─────────────────────────────────────────────────────────────────────────┐
│ Calibrating the first one of the plurality of cameras and the second one of the plurality of │
│ cameras by matching same pattern between the first set of one or more images │
│ of the object and the second set of one or more images and utilizing the │
│ encoded coordinate information that was decoded 320 │
└─────────────────────────────────────────────────────────────────────────┘
                                        ⇓
┌─────────────────────────────────────────────────────────────────────────┐
│ Recalibrating a subset of the plurality of cameras after a time period or when any of the re-projection errors │
│ exceeds a certain value 325 │
└─────────────────────────────────────────────────────────────────────────┘
```

SMART SELF CALIBRATING CAMERA SYSTEM

BACKGROUND OF THE INVENTION

This application relates to systems, methods, devices, and other techniques for video camera self-calibration based on video information received from more than one video cameras.

Methods and apparatus for calibrating cameras in the certain areas are very common. Some methods are using reference objects and manual methods to calibrate the cameras. However, these methods need human intervention and cost time and money.

Therefore, it is desirable to have systems and methods to enable self-calibration for the cameras to save time and efforts.

SUMMARY OF THE INVENTION

This application relates to systems, methods, devices, and other techniques for video camera self-calibration based on video information received from more than one video cameras. In some embodiments, the system uses people as calibration markers. Instead of finding feature matches between cameras, the system matches one or more persons between cameras. Then the system identifies certain body key points of the one or more persons and then matches these key points. In addition, the system implements automatic re-calibration in a specific way to reduce human intervention, cost and time. In some embodiments, the system extracts detections from each camera, and then synchronizes frames using time-stamp, and then clusters one or more persons using re-id features. The system then aggregates key points from one or more persons along time for each camera. The system then finds matches same time, same person key points on camera pairs and then runs un-calibrated structure from motion on the key point matches. The system then aligns and upgrades scale using one or more persons' head and feet key points or the known camera height.

In some embodiments, the system implements a self-healing scheme to recalibrate after these situations (but not limited to these situations): accidental or on purpose camera position changes, change of focus or aspect ratio, or camera upgrades.

In some embodiments, when the system uses this self-healing scheme, the system uses multi-camera tracking to match people and key points. Then the system triangulates and projects key point coordinates. The system monitors accumulated errors over time. If the accumulated error is large, re-calibration is needed. If re-calibration is needed, the system runs people-based calibration.

In some implementations, this kind of method is synchronizing system time for the plurality of cameras, and then the method is detecting at least one feature points of an object that is within range of the plurality of cameras, wherein the at least one feature points are setup in a pre-determined fashion, wherein the at least one feature points are configured within range of the plurality of cameras, wherein the at least one feature points are configured to be detected by color or infrared means, wherein any point of the at least one feature points are encoded with location information of the at least one feature points, wherein the location information of the at least one feature points are decoded and recorded during a duration of time; and then the method is calibrating the plurality of cameras by using the location information of the at least one feature points during a duration of time.

In some embodiments, the at least one feature points are encoded with color or depth information.

In some embodiments, the method is further comprising: Capturing a first set of one or more images of the feature points by a first one of the plurality of cameras and a second set of one or more images of the feature points by a second one of the plurality of cameras; and Calibrating the first one of the plurality of cameras and the second one of the plurality of cameras by matching same feature points between the first set of one or more images of the object and the second set of one or more images, wherein the color or depth information is used for the matching of the same feature points, wherein the first one of the plurality of cameras and the second of the plurality of cameras are configured to pan, tilt and zoom. In some embodiments, the method further comprises a step of recalibrating a subset of the plurality of cameras after a time period or when any of the re-projection errors exceeds a certain value.

In some embodiments, the at least one feature points are not visible to human eyes and RGB cameras, wherein the at least one feature points are visible to infrared cameras.

In some embodiments, the at least one feature points are lines, dots or polygons.

In some embodiments, a user can manually be involved in the calibrating. In some embodiments, the object is configured to move. In some embodiments, the plurality of cameras is configured to move. In some embodiments, a neural network is configured to match and identify the at least one feature points.

In some embodiments, the invention is related to a method of for calibrating a plurality of cameras in an area, comprising: Detecting feature points of a person, wherein the feature points are specific body area of the person, wherein the feature points are within range of the plurality of cameras, wherein dimensions of the specific body area of the person are measured and recorded; Capturing a first set of one or more images of the feature points by a first one of the plurality of cameras and a second set of one or more images of the feature points by a second one of the plurality of cameras; and Calibrating the first one of the plurality of cameras and the second one of the plurality of cameras by matching same feature points between the first set of one or more images of the object and the second set of one or more images.

In some embodiments, the at least one feature points are not visible to human eyes and RGB cameras. In some embodiments, the at least one feature points are visible to infrared cameras. In some embodiments, the at least one feature points are lines, dots or polygons. In some embodiments, a user can manually be involved in the calibrating.

In some embodiment, the invention is related to a method of for calibrating a plurality of cameras in an area, comprising: Detecting patterns in the area, wherein location of the patterns are pre-determined, wherein shape of the patterns are pre-determined, wherein color of the patterns are pre-determined, wherein the patterns are configured to contain encoded coordinate information, wherein the patterns are configured to be detected by optical or infrared means; Capturing a first set of one or more images of the patterns by a first one of the plurality of cameras and a second set of one or more images of the patterns by a second one of the plurality of cameras; Decoding the encoded coordinate information; and Calibrating the first one of the plurality of cameras and the second one of the plurality of cameras by matching same pattern between the first set of one or more images of the object and the second set of one or more images and utilizing the encoded coordinate information that was decoded.

In some embodiments, wherein the plurality of cameras are configured to move. In some embodiments, a neural network is configured to match and identify the at least one feature points. In some embodiments, translucent stickers covered with some infrared ink to mark the patterns. In some embodiments, the method further comprises a step of recalibrating a subset of the plurality of cameras after a time period or when any of the re-projection errors exceeds a certain value. In some embodiments, translucent stickers are covered with some infrared ink to mark the patterns.

These and other aspects, their implementations and other features are described in details in the drawings, the description and the claims.

BRIEF DESCRIPTION OF THE DRAWINGS

FIG. 1 shows a method for self-calibrating a plurality of cameras in an area.
FIG. 2 shows another method for calibrating a plurality of cameras in an area.
FIG. 3 shows a third method for calibrating a plurality of cameras in an area.

DETAILED DESCRIPTION OF THE INVENTION

FIG. 1 shows a method 100 for self-calibrating a plurality of cameras in an area. In some implementations, the method comprises a step 105 of synchronizing system time for the plurality of cameras.

In some embodiments, the method comprises a step 110 of detecting at least one feature points of an object that is within range of the plurality of cameras, wherein the at least one feature points are setup in a pre-determined fashion, wherein the at least one feature points are configured within range of the plurality of cameras, wherein the at least one feature points are configured to be detected by color or infrared means, wherein any point of the at least one feature points are encoded with location information of the at least one feature points, wherein the location information of the at least one feature points are decoded and recorded during a duration of time.

In some embodiments, the method comprises a step 115 of calibrating the plurality of cameras by using the location information of the at least one feature points during a duration of time.

In some embodiments, the method comprises a step 120 of capturing a first set of one or more images of the feature points of the object along the route by a first one of the plurality of cameras and a second set of one or more images of the feature points of the object along the route by a second one of the plurality of cameras, wherein time stamp is recorded for each capturing.

In some embodiments, the method comprises a step 125 of calibrating the first one of the plurality of cameras and the second one of the plurality of cameras by matching same feature points on the object between the first set of one or more images of the object and the second set of one or more images of the object at same time stamp.

In some embodiments, the at least one feature points are encoded with color or depth information. In some embodiments, the method is further comprising: Capturing a first set of one or more images of the feature points by a first one of the plurality of cameras and a second set of one or more images of the feature points by a second one of the plurality of cameras; and Calibrating the first one of the plurality of cameras and the second one of the plurality of cameras by matching same feature points between the first set of one or more images of the object and the second set of one or more images, wherein the color or depth information is used for the matching of the same feature points, wherein the first one of the plurality of cameras and the second of the plurality of cameras are configured to pan, tilt and zoom. In some embodiments, the method further comprises a step of recalibrating a subset of the plurality of cameras after a time period or when any of the re-projection errors exceeds a certain value.

In some embodiments, the at least one feature points are not visible to human eyes and RGB cameras, wherein the at least one feature points are visible to infrared cameras.

In some embodiments, the at least one feature points are lines, dots or polygons.

In some embodiments, a user can manually be involved in the calibrating. In some embodiments, the object is configured to move. In some embodiments, the plurality of cameras is configured to move. In some embodiments, a neural network is configured to match and identify the at least one feature points. In some embodiments, the method comprises a step of recalibrating a subset of the plurality of cameras after a time period or when any of the re-projection errors exceeds a certain value.

FIG. 2 shows a method 200 for self-calibrating a plurality of cameras in an area. In some implementations, the method comprises a step 205 of detecting feature points of a person, wherein the feature points are specific body area of the person, wherein the feature points are within range of the plurality of cameras, wherein dimensions of the specific body area of the person are measured and recorded.

In some embodiments, the method comprises a step 210 of capturing a first set of one or more images of the feature points by a first one of the plurality of cameras and a second set of one or more images of the feature points by a second one of the plurality of cameras.

In some embodiments, the method comprises a step 215 of calibrating the first one of the plurality of cameras and the second one of the plurality of cameras by matching same feature points between the first set of one or more images of the object and the second set of one or more images.

In some embodiments, the at least one feature points are not visible to human eyes and RGB cameras. In some embodiments, the at least one feature points are visible to infrared cameras. In some embodiments, the at least one feature points are lines, dots or polygons. In some embodiments, a user can manually be involved in the calibrating.

FIG. 3 shows another method 300 for calibrating a plurality of cameras in an area.

In some embodiments, the method comprises a step 305 of detecting patterns in the area, wherein location of the patterns are pre-determined, wherein shape of the patterns are pre-determined, wherein color of the patterns are pre-determined, wherein the patterns are configured to contain encoded coordinate information, wherein the patterns are configured to be detected by optical or infrared means.

In some embodiments, the method comprises a step 310 of capturing a first set of one or more images of the patterns by a first one of the plurality of cameras and a second set of one or more images of the patterns by a second one of the plurality of cameras.

In some embodiments, the method comprises a step 315 of decoding the encoded coordinate information.

In some embodiments, the method comprises a step 320 of calibrating the first one of the plurality of cameras and the second one of the plurality of cameras by matching same pattern between the first set of one or more images of the object and the second set of one or more images and utilizing the encoded coordinate information that was decoded.

In some embodiments, the method comprises a step 325 of recalibrating a subset of the plurality of cameras after a time period or when any of the re-projection errors exceeds a certain value.

In some embodiments, the first object is a person. In some embodiments, one of the feature points is the person's head. In some embodiments, the position information of the same feature points is X and Y coordinates within an image. In some embodiments, the object is configured to move freely.

In some embodiments, wherein the plurality of cameras are configured to move. In some embodiments, a neural network is configured to match and identify the at least one feature points. In some embodiments, translucent stickers covered with some infrared ink to mark the patterns. In some embodiments, the method further comprises a step of recalibrating a subset of the plurality of cameras after a time period or when any of the re-projection errors exceeds a certain value. In some embodiments, translucent stickers are covered with some infrared ink to mark the patterns.

The invention claimed is:

1. A method for calibrating a plurality of cameras in an area, comprising:

Synchronizing system time for the plurality of cameras;

Detecting at least one feature points of an object that is within range of the plurality of cameras, wherein the at least one feature points are setup in a pre-determined fashion, wherein the at least one feature points are configured within range of the plurality of cameras, wherein the at least one feature points are configured to be detected by color or infrared means, wherein any point of the at least one feature points are encoded with location information of the at least one feature points, wherein the location information of the at least one feature points are decoded and recorded during a duration of time, wherein the at least one feature points are encoded with color, infrared and depth information;

Calibrating the plurality of cameras by using the location information of the at least one feature points during a duration of time;

Capturing a first set of one or more images of the feature points by a first one of the plurality of cameras and a second set of one or more images of the feature points by a second one of the plurality of cameras;

Calibrating the first one of the plurality of cameras and the second one of the plurality of cameras by matching same feature points between the first set of one or more images of the object and the second set of one or more images, wherein the color and depth information is used for the matching of the same feature points, wherein the first one of the plurality of cameras and the second of the plurality of cameras are configured to pan, tilt and zoom; and Implements a self-healing scheme to recalibrate after camera changes, change of focus and camera upgrades, wherein people-based calibration is activated during the recalibrating.

2. The method for calibrating a plurality of cameras in an area of claim 1, further comprising:

Recalibrating a subset of the plurality of cameras after a time period or when any of the re-projection errors exceeds a certain value, wherein the certain value can be changed manually.

3. The method for calibrating a plurality of cameras in an area of claim 1, wherein the at least one feature points are not visible to human eyes and RGB cameras, wherein the at least one feature points are visible to infrared cameras.

4. The method for calibrating a plurality of cameras in an area of claim 1, wherein the at least one feature points are lines, dots or polygons.

5. The method for calibrating a plurality of cameras in an area of claim 1, wherein a user can manually involve in the calibrating.

6. The method for calibrating a plurality of cameras in an area of claim 1, wherein the object is configured to move.

7. The method for calibrating a plurality of cameras in an area of claim 1, wherein the plurality of cameras are configured to move.

8. The method for calibrating a plurality of cameras in an area of claim 1, wherein a neural network is configured to match and identify the at least one feature points.

9. The method for calibrating a plurality of cameras in an area of claim 1, further comprising:

Recalibrating a subset of the plurality of cameras after a time period or when any of the re-projection errors exceeds a certain value.

* * * * *